(12) United States Patent
Clark

(10) Patent No.: US 10,197,105 B2
(45) Date of Patent: Feb. 5, 2019

(54) MOTOR VEHICLE CLUTCH ASSEMBLY INCLUDING STOP FOR LIMITING LIFTOFF OF A CLUTCH PLATE ASSEMBLY

(71) Applicant: Schaeffler Technologies AG & Co. KG, Herzogenaurach (DE)

(72) Inventor: Justin Clark, Ravenna, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 139 days.

(21) Appl. No.: 15/436,776

(22) Filed: Feb. 18, 2017

(65) Prior Publication Data

US 2018/0238397 A1    Aug. 23, 2018

(51) Int. Cl.
| F16D 13/52 | (2006.01) |
| F16H 45/02 | (2006.01) |
| F16F 15/121 | (2006.01) |

(52) U.S. Cl.
CPC .......... *F16D 13/52* (2013.01); *F16F 15/1215* (2013.01); *F16H 45/02* (2013.01); *F16D 2250/0076* (2013.01); *F16D 2250/0084* (2013.01); *F16D 2300/22* (2013.01); *F16H 2045/0221* (2013.01); *F16H 2045/0284* (2013.01)

(58) Field of Classification Search
CPC ............. F16D 13/52; F16D 2250/0076; F16D 2250/0084; F16D 2300/22; F16H 45/02; F16H 2045/0021; F16H 45/0284; F16F 15/1215
See application file for complete search history.

(56) References Cited

U.S. PATENT DOCUMENTS

| 2004/0107698 | A1* | 6/2004 | Schleicher | ............. | F16H 41/28 60/330 |
| 2006/0207853 | A1* | 9/2006 | Ackermann | ............ | F16H 45/02 192/3.29 |
| 2007/0151822 | A1 | 7/2007 | Toya et al. | | |
| 2008/0060895 | A1* | 3/2008 | Heck | ...................... | F16H 45/02 192/3.28 |

(Continued)

OTHER PUBLICATIONS

Search Report and Written Opinion for corresponding PCT application.

*Primary Examiner* — Huan Le
(74) *Attorney, Agent, or Firm* — Davidson, Davidson & Kappel, LLC

(57) ABSTRACT

A motor vehicle clutch assembly is provided. The motor vehicle clutch assembly includes a radially extending section including an abutment surface; a clutch pack including a first clutch plate and a separator plate; an axially movable piston for engaging the clutch pack; and elastic connectors connecting the separator plate to the radially extending section. The elastic connectors preload the separator plate away from the abutment surface. The motor vehicle clutch assembly also includes a stop arranged for contacting the separator plate to limit axial movement of the separator plate away from the abutment surface. The stop is an axial distance away from the abutment surface such that the separator plate is forceable by the elastic connectors against the stop to provide clearance such that the first clutch plate is movable away from the abutment surface. A method of forming a motor vehicle clutch assembly is also provided.

15 Claims, 1 Drawing Sheet

(56) References Cited

U.S. PATENT DOCUMENTS

| | | | |
|---|---|---|---|
| 2011/0120829 A1* | 5/2011 | Vanni | F16H 45/02 |
| | | | 192/3.29 |
| 2013/0048459 A1 | 2/2013 | Matsuoka | |
| 2014/0008174 A1 | 1/2014 | Tomiyama | |
| 2014/0027231 A1 | 1/2014 | Tanaka et al. | |
| 2016/0109012 A1 | 4/2016 | Tatsuyuki et al. | |

\* cited by examiner

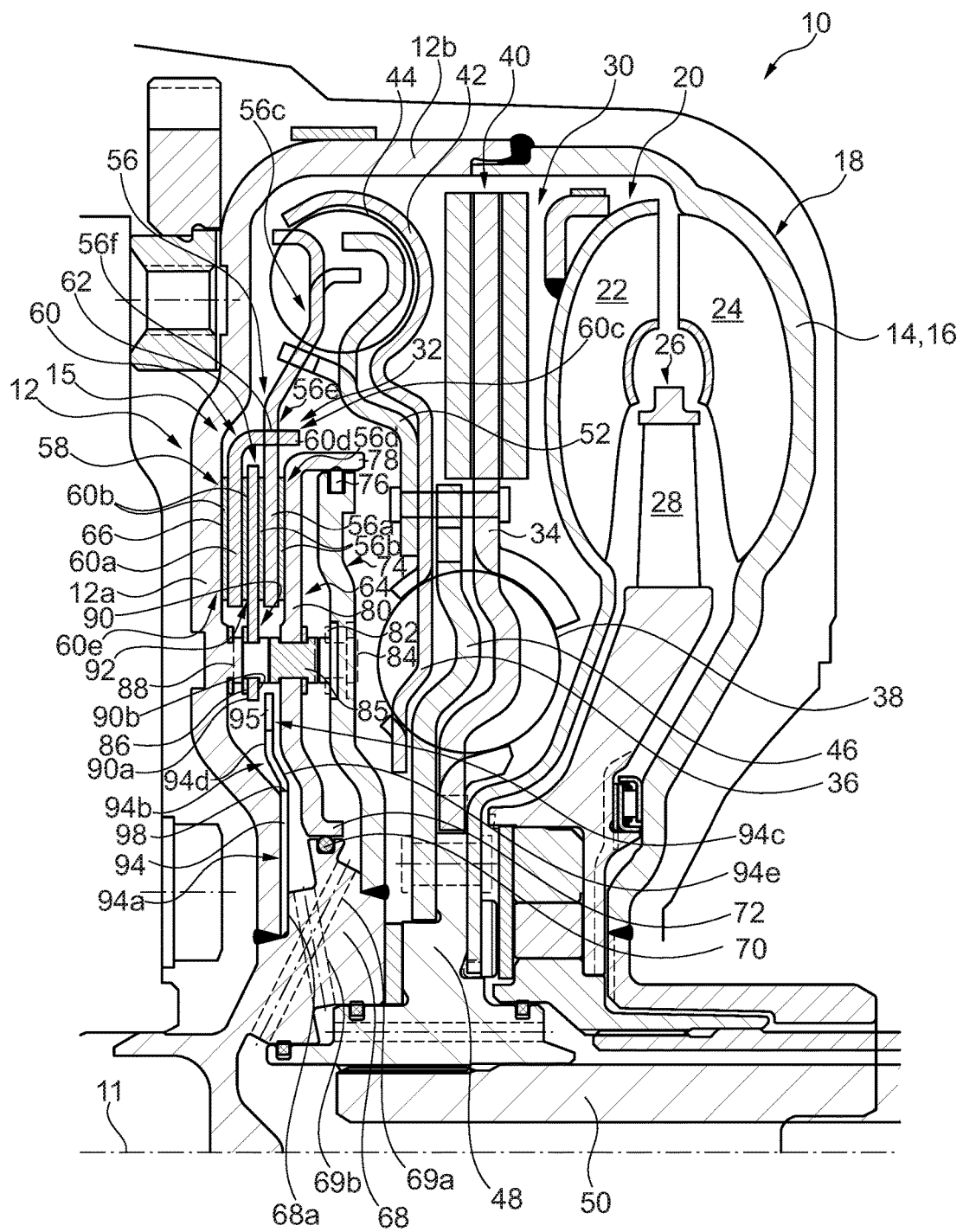

MOTOR VEHICLE CLUTCH ASSEMBLY INCLUDING STOP FOR LIMITING LIFTOFF OF A CLUTCH PLATE ASSEMBLY

The present disclosure relates generally to motor vehicle clutch assemblies and more specifically to a stop for limiting liftoff of a clutch plate assembly in a torque converter.

BACKGROUND

A step height of a leaf spring can be used to limit the liftoff of a clutch plate assembly, but leaf spring does not provide a true dead stop for the clutch plate. There is also a large tolerance on the form height of the leaf spring which negatively affects clutch clearance and liftoff control.

SUMMARY OF THE INVENTION

A motor vehicle clutch assembly is provided. The motor vehicle clutch assembly includes a radially extending section including an abutment surface; a clutch pack including a first clutch plate and a separator plate; an axially movable piston for engaging the clutch pack; and elastic connectors connecting the separator plate to the radially extending section. The elastic connectors preload the separator plate away from the abutment surface. The motor vehicle clutch assembly also includes a stop arranged for contacting the separator plate to limit axial movement of the separator plate away from the abutment surface. The stop is an axial distance away from the abutment surface such that the separator plate is forceable by the elastic connectors against the stop to provide clearance such that the first clutch plate is movable away from the abutment surface.

A torque converter including the clutch assembly is also provided.

A method of forming a motor vehicle clutch assembly is also provided. The method includes providing a clutch pack including a first clutch plate and a separator plate; providing an axially movable piston for engaging the clutch pack; elastically connecting the separator plate to a radially extending section by a plurality of elastic connectors, the elastic connectors preloading the separator plate away from an abutment surface of the radially extending section; and providing a stop arranged for contacting the separator plate to limit axial movement of the separator plate away from the abutment surface. The stop is an axial distance away from the abutment surface such that the separator plate is forceable by the elastic connectors against the stop to provide clearance such that the first clutch plate is movable away from the abutment surface.

BRIEF DESCRIPTION OF THE DRAWINGS

The present invention is described below by reference to the following drawings, in which:

FIG. 1 shows a cross-sectional side view of a torque converter according to an embodiment of the present invention.

DETAILED DESCRIPTION

The disclosure provides a dead stop to control lift off between clutch plates in a quad plate clutch design. The dead stop is formed as a plate with holes to allow even flow distribution between the clutch plates. The dead stop plate can be connected to the cover by laser welding. The plate height allows enough lift off of the left clutch plate assembly. Leaf springs connect a clutch plate to the cover and are large enough to always push a separator plate of the clutch pack against the dead stop.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Front cover 12 is substantially cup-shaped and includes a radially extending section 12a that intersects and extends radially away from center axis 11 and an annular axially extending section 12b that protrudes axially at an outer circumference of section 12a. Torque converter 10, in a known manner, also includes a turbine 20 including a plurality of turbine blades 22, impeller 18 including a plurality of impeller blades 24 and a stator 26 including a plurality of stator blades 28 axially between the turbine 20 and the impeller 18. During operation, impeller 18 is rotated via the internal combustion engine, causing impeller blades 24 to create a fluid flow that drives the turbine blades 22. The fluid is redirected from the turbine 20 back to impeller 18 by stator blades 28.

Torque converter 10 also includes a damper assembly 30 connecting turbine 20 to a lockup clutch 32 of a clutch assembly 15. Damper assembly 30 includes a two cover plates 34, 36 supporting a radially inner set of springs 38, with a radially outer end of the turbine-side cover plate 34 forming an intermediate flange of a centrifugal pendulum absorber 40 an a radially outer end of front cover-side cover plate 36 forming a spring retainer 42 for a radially outer set of springs 44. A drive flange 46, which is driven by cover plates 34, 36 via springs 38, is provided axially between cover plates 34, 36 and is connected to a damper hub 48 configured for non-rotatably connecting to a transmission input shaft 50. Damper assembly 30 further includes a drive plate 52 fixed to cover plate 36 that is arranged for contacting end of springs 44 such that damper assembly is drivable by the lockup clutch 32 via springs 44.

Damper assembly 30 is drivingly connected to a radially outer radial portion 56c of a first clutch plate 56 of a clutch pack 58 of lockup clutch 32. Clutch pack 58 in this embodiment includes three plates—clutch plate 56, a further clutch plate 60 and a separator plate 62 separating clutch plates 56, 60; however, in other embodiments, the number of plates in the clutch pack can be different than three. Clutch plate 56 includes a radially outer portion 56c that is drivingly connected to damper assembly 30 via contact with springs 44 and a radially inner portion 56d for clutch engagement. Between the radially outer portion 56c and the radially inner portion 56d, clutch plate 56 includes an intermediate portion 56e supporting an axially extending rim 60c of clutch plate 60. More specifically, intermediate portion 56e includes circumferentially spaced slots 56f extending axially therethrough, with each of slots 56f receiving one of a plurality of circumferentially spaced tabs 60d of rim 60c that extend axially through slots 56f. Radially inside of rim 60c, clutch plate 60 includes a radially inner portion 60e for clutch engagement.

Lockup clutch 32 further includes an abutment surface formed by an inner surface 66 of radially extending section 12a of front cover 12 and a piston 64 for engaging clutch pack 58 by forcing clutch pack 58 against inner surface 66. More specifically, piston 64 contacts first clutch plate 56 and forces clutch plate 56 to force plates 60, 62 toward the engine such that clutch plate 60 contacts inner surface 66.

Clutch plates 56, 60 each include a metal base plate 56a, 60a and friction material 56b, 60b on both radially extending and axially facing surfaces of base plates 56a, 60a, respectively. In other arrangements, plate 62, piston 64 and/or inner surface 66 can include friction material in place of one or more of friction material 56b, 60b. During engagement, piston 64 contacts friction material 56b of plate 56 and friction material 60b of plate 60 is pressed against inner surface 66 of front cover 12.

Piston 64 is axially slidable along a hub section 68 that is non-rotatably fixed to radially extending section 12a of front cover 12. Hub section 68 includes a channel 69a for feeding fluid to a transmission-side of piston 64 and a channel 69b for feeding fluid to an engine-side of piston 64. Hub section 68 is provided with a seal ring 70 in a groove at an outer circumferential surface thereof. An inner circumferential surface of an inner axially extending ring section 72 of piston 64 contacts seal ring 70 such that piston 64 is sealed with respect to hub section 68 at an innermost circumferential surface of piston 64. A radially extending support plate 74 is fixed to hub section 68 for example by welding. Support plate 74 protrudes radially outward from hub section 68 and is provided with a seal ring 76 at an outer circumferential surface thereof for contacting an inner circumferential surface of an outer axially extending ring section 78 of piston 64. Piston 64 further includes a radially extending ring section 80 extending radially outward from inner ring section 72 to outer ring section 78. Piston 64 is elastically connected to support plate 74 by a plurality of circumferentially spaced elastic connectors, which in this embodiment are the form of leaf springs 82, such that piston 64 is axially movable away from support plate 74 to engage the lockup clutch 32, but is preloaded away from the clutch pack 58 in a coast condition. Each leaf spring 82 is fixed to support plate 74 by a respective first fastener, in the form of a first rivet 84, passing through support plate 74 and is fixed to piston 64 by a respective second fastener, in the form a second rivet 85, passing through ring section 80 of piston 64.

Separator plate 62 is also elastically connected to radially extending section 12a of front cover 12 by a plurality of circumferentially spaced elastic connectors, which in this embodiment are the form of leaf springs 86, such that piston 64 is axially movable with respect to front cover 12 during clutch engagement and disengagement. Each leaf spring 86 is fixed to radially extending section 12a of front cover 12 by a respective first fastener, in the form of an extruded rivet 88 formed from front cover 12, and is fixed to separator plate 62 by a respective second fastener, in the form a rivet 88 passing through a radially inner portion 90 of separator plate 62. A radially outer portion 92 of separator plate 62 is positioned axially between clutch plates 56, 60. Leaf springs 86 are fixed to an engine-side facing radially extending surface 90a of radially inner portion 90.

Clutch assembly 15 further includes a stop 95 formed at the end of a dead stop plate 94, which is rigid and is fixed to radially extending section 12a of front cover 12 for limiting axial movement of separator plate 62 away from radially extending section 12a. In one preferred embodiment, stop plate 94 is laser welded to radially extending section 12a. Stop plate 94 includes a radially inner portion 94a fixed to radially extending section 12a, an intermediate portion 94b radially outside of radially inner portion 94a and a radially outer portion 94c forming stop 95 that is configured for contacting transmission-side surface 90b of a radially inner end of radially inner portion 90 of separator plate 62. An inner radial end of radially inner portion 94a is sandwiched between inner surface 66 of front cover 12 and an engine-side facing radially extending surface 68a of hub section 68.

In the embodiment shown in FIG. 1, stop plate 14 is fixed to radially extending section 12a of front cover 12 by a laser weld 96 at an inner circumferential surface radially extending section 12a of front cover 12 that also fixes hub section 68 to the inner circumferential surface of radially extending section 12a. Stop plate 94 is provided at an engine-side of channel 69b in hub section 68 such that channel 69b feeds into a region axially between stop plate 94 and piston 64. Intermediate portion 94b is provided with a plurality of circumferentially spaced holes 98 extending axially through stop plate 94 from an engine-side radially extending surface 94d to a radially extending transmission-side surface 94e. Holes 98 are provided to allow fluid from channel 69b to flow axially through stop plate 94 and radially outward directly to clutch plate 60 to provide even flow distribution between the two clutch plates 56, 60.

In the embodiment shown in FIG. 1, radially inner portion 94a extends radially along inner surface 66 of front cover 12 perpendicular to center axis 11, then intermediate portion 94b angles axially toward radially extending section 12a of front cover 12 while extending radially outward, before extending directly radially outward to outer portion 94c, which extends radially outward such that an outer diameter of stop plate 94 is radially outside of an inner diameter of separator plate 60. Leaf springs 86 preload separator plate 62 away from inner surface 66 of front cover 12 providing a clearance such that clutch plate 60 can lift off of inner surface 66 when the lockup clutch 32 is disengaged. Radially outer portion 94c of stop plate 94 is positioned an axial distance away from inner surface 66 such that when piston 64 is not forcing clutch pack 58 into front cover 12, leaf springs 86 preload the separator plate 62 away from inner surface 66 and radially inner portion 90 of separator plate 62 contacts the radially outer portion 94c of stop plate 94 and clutch plate 60 can lift off of inner surface 66.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A motor vehicle clutch assembly comprising:
   a radially extending section including an abutment surface;
   a clutch pack including a first clutch plate and a separator plate;
   an axially movable piston for engaging the clutch pack;
   elastic connectors connecting the separator plate to the radially extending section, the elastic connectors preloading the separator plate away from the abutment surface; and
   a stop arranged for contacting the separator plate to limit axial movement of the separator plate away from the abutment surface, the stop being an axial distance away from the abutment surface such that the separator plate is forceable by the elastic connectors against the stop to provide clearance such that the first clutch plate is movable away from the abutment surface.

2. The motor vehicle clutch assembly as recited in claim 1 wherein the stop is formed by a radially outer portion of a stop plate, the stop plate including a plurality of holes extending axially therethrough for allowing fluid to flow from a transmission-side surface of the stop plate through the holes and radially outward to the first clutch plate.

3. The motor vehicle clutch assembly as recited in claim 2 wherein the radially extending section is part of a front cover, the abutment surface being formed by an inner surface of the radially extending section of the front cover, the stop plate being fixed to the radially extending section of the front cover.

4. The motor vehicle clutch assembly as recited in claim 3 further comprising a hub section fixed to the front cover, the piston being sealingly slidable axially along the hub section.

5. The motor vehicle clutch assembly as recited in claim 4 wherein the hub section and the stop plate are fixed to the front cover by a same weld.

6. The motor vehicle clutch assembly as recited in claim 5 wherein the weld is a laser weld.

7. The motor vehicle clutch assembly as recited in claim 5 wherein the weld is provided at an inner circumferential surface of the radially extending section of the front cover.

8. The motor vehicle clutch assembly as recited in claim 1 wherein the elastic connectors are formed by a plurality of circumferentially spaced leaf springs.

9. The motor vehicle clutch assembly as recited in claim 1 wherein the clutch pack further includes a second clutch plate, the separator plate being positioned axially between the first clutch plate and the second clutch plate.

10. The motor vehicle clutch assembly as recited in claim 9 wherein the separator plate includes a radially outer portion for engaging a radially inner portion of the first clutch plate and a radially inner portion of the second clutch plate.

11. A torque converter including the motor vehicle clutch assembly as recited in claim 1.

12. A method of forming a motor vehicle clutch assembly comprising:
   providing a clutch pack including a first clutch plate and a separator plate;
   providing an axially movable piston for engaging the clutch pack;
   elastically connecting the separator plate to a radially extending section by a plurality of elastic connectors, the elastic connectors preloading the separator plate away from an abutment surface of the radially extending section; and
   providing a stop arranged for contacting the separator plate to limit axial movement of the separator plate away from the abutment surface, the stop being an axial distance away from the abutment surface such that the separator plate is forceable by the elastic connectors against the stop to provide clearance such that the first clutch plate is movable away from the abutment surface.

13. The method as recited in claim 12 wherein the stop is formed by a radially outer portion of a stop plate, the stop plate including a plurality of holes extending axially therethrough for allowing fluid to flow from a transmission-side surface of the stop plate through the holes and radially outward to the first clutch plate.

14. The method as recited in claim 13 wherein the abutment surface is formed by an inner surface of a radially extending section of a front cover, the method including fixing the stop plate and a hub section to the radially extending section of the front cover via a same weld, the piston being sealingly slidable axially along the hub section.

15. The method as recited in claim 14 wherein the fixing the stop plate and the hub section to the radially extending section includes laser welding the stop plate and the hub section to the radially extending section.

* * * * *